United States Patent [19]

Bauman et al.

[11] Patent Number: 4,618,645

[45] Date of Patent: Oct. 21, 1986

[54] METHOD OF PRODUCING AQUEOUS LATEX OF CROSSLINKED POLYDIORGANOSILOXANE

[75] Inventors: Therese M. Bauman; David J. Huebner, both of Midland, Mich.

[73] Assignee: Dow Corning Corporation, Midland, Mich.

[21] Appl. No.: 737,600

[22] Filed: May 24, 1985

[51] Int. Cl.[4] .......................... C08K 5/41; C08K 5/42; C08L 83/14

[52] U.S. Cl. .................................... 524/745; 524/837; 521/154

[58] Field of Search .................. 524/837, 588, 745

[56] References Cited

U.S. PATENT DOCUMENTS

| | | | |
|---|---|---|---|
| 3,294,725 | 12/1966 | Findley et al. | 260/29.2 |
| 3,360,491 | 12/1967 | Axon | 260/29.2 |
| 3,697,469 | 10/1972 | Ikoma | 528/23 |
| 3,706,695 | 12/1972 | Huebner et al. | 117/226 |
| 4,427,811 | 1/1984 | Elias | 524/588 |
| 4,486,567 | 12/1984 | Bowman | 524/588 |
| 4,496,687 | 1/1985 | Okada | 524/588 |
| 4,554,187 | 11/1985 | Grape | 524/588 |
| 4,567,231 | 1/1986 | Huebner | 524/837 |
| 4,568,718 | 2/1986 | Huebner | 524/837 |
| 4,584,341 | 4/1986 | Huebner | 524/837 |

FOREIGN PATENT DOCUMENTS

| | | | |
|---|---|---|---|
| 57-57063 | 12/1982 | Japan . | |
| 58-101153 | 6/1983 | Japan | 524/588 |
| 1024024 | 3/1966 | United Kingdom . | |

Primary Examiner—C. Warren Ivy
Attorney, Agent, or Firm—Edward C. Elliott

[57] ABSTRACT

A method of producing an emulsion of crosslinked polydiorganosiloxane admixes hydroxyl endblocked polydiorganosiloxane, alkoxy silicone compound, anionic emulsifying agent, and water. The mixture is homogenized, then the emulsion is admixed with surface active anionic catalyst. Maintaining the catalyzed emulsion, having a pH of less than 5, at room temperature allows the ingredients to react to raise the molecular weight of the polydiorganosiloxane and to crosslink the polymer. The reaction is halted by adding sufficient base to raise the pH to greater than 7. The resultant latex yields an elastomer upon removal of the water. When colloidal silica is also added to the mixture before homogenization, the final latex yields a reinforced elastomer upon removal of the water.

15 Claims, No Drawings

METHOD OF PRODUCING AQUEOUS LATEX OF CROSSLINKED POLYDIORGANOSILOXANE

BACKGROUND OF THE INVENTION

1. Field of the Invention

This invention relates to a method of producing a silicone water-based emulsion by polymerizing hydroxyl endblocked polydiorganosiloxane in the presence of silica and alkoxy silicon compound.

2. Background Information

A method of polymerizing siloxanes and silcarbanes in emulsion by using a surface active sulfonic acid catalyst is disclosed by Findlay and Weyenberg in U.S. Pat. No. 3,294,725, issued Dec. 27, 1966. Their method comprises polymerizing and copolymerizing at least one member selected from organosiloxanes of the unit formula $R_nSiO_{4-n/2}$ and silcarbanes having the general formula $HO(R)_2SiQSi(R)_2OH$ in an aqueous medium while in the dispersed state, in the presence of a compound of the formula $R'C_6H_4SO_3H$ as the primary catalyst for the polymerization until the desired increase in molecular aggregation is obtained. These emulsions are stated to be characterized by extreme stability and extremely fine particle size. The products produced were higher molecular weight fluids or solids. In the particular embodiment in which the starting siloxane has a formula

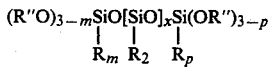

it is stated that the product, after neutralization, is a polysiloxane which does not appear gelled but when removed from the emulsion, does gel to a crosslinked rubber. Fillers can be added to the emulsion so that the strength of the rubber resulting from coagulation of the emulsion is further improved.

Axon discloses a method of polymerizing siloxanes and silcarbanes in emulsion employing organic sulfates of the general formula $R'OSO_2OH$ in U.S. Pat. No. 3,360,491, issued Dec. 26, 1967. His method comprises polymerizing and copolymerizing at least one member of the group consisting of organosiloxanes of the unit formula $R_nSiO_{4-n/2}$ and silcarbanes having the general formula $HO(R)_2SiQSi(R)_2OH$ by polymerizing in an aqueous medium while in a dispersed state in the presence of a compound of the formula $R'OSO_2OH$ until the desired increase in molecular aggregation is obtained. The emulsions are stated as being suitable for release agents and for coating compositions. His embodiment prepared from an alkylalkoxysiloxy endblocked diorganosiloxane is stated as polymerizing to a polysiloxane which does not appear to be gelled, but which when removed from the emulsion, does gel to a crosslinked rubber. Fillers can be added to the emulsion to improve the strength of the rubber resulting from the coagulation of the emulsion. The reinforced emulsion system provides an excellent method of obtaining coatings of tough rubbery siloxane films for release coatings.

A method for emulsion polymerization of organosiloxanes is disclosed by Ikoma in U.S. Pat. No. 3,697,469, issued Oct. 10, 1972. His method emulsifies, in water containing a salt-type anionic surface active agent, an organosiloxane having the unit formula $R_aSiO_{4-a/2}$ and then contacting said emulsion with an acid-type cationic exchange resin. The ion exchange converts the salt-type surface active agent to an acid-type thereby starting polymerization of the organosiloxane by making the emulsion an acid medium with a pH value of less than 4. The method is shown to polymerize organocyclosiloxanes, polysiloxane fluids, mixtures of organocyclosiloxanes and alkylalkoxysilanes, mixtures of organocyclosiloxanes and polysiloxane fluids, and alkylalkoxysilanes to give emulsions of polysiloxanes of increased viscosity. The emulsions are useful as coatings to give release properties, lubricants for textiles, and water repellent for textiles. An example combining an organocyclosiloxane and alkyltrialkoxysilane and polymerizing, then mixing the polymerized emulsion with a 10 percent sol of fine silica particles and dibutyltindioctoate emulsion gave a sheet upon drying which was a rubber.

A method of preparing an electrically conductive silicone emulsion is disclosed by Huebner and Meddaugh in U.S. Pat. No. 3,706,695, issued Dec. 19, 1972. The method dissolves a surface active sulfonic acid in water, mixes in a siloxane fluid and homogenizes the mixture to provide a stable dispersion. The dispersion is heated for at least one hour to polymerize the siloxanes, then adds a nonionic emulsifying agent and neutralizes the acid to give a pH of 6.5 to 9. Finely divided carbon black, a metallic salt of a carboxylic acid and a silane of the formula $RSi(OR')_3$ are then mixed into the emulsion. When the emulsion is applied to a substrate and dried, a heat stable electrically conductive silicone rubber is formed. Satisfactory cure is obtained for a period of about two weeks after mixing. The curability can be restored by adding additional catalyst, alkoxysilane or both.

Japanese Patent Publication No. 57-57063, published Dec. 2, 1982, teaches a silicone aqueous emulsion composition which cures to an elastomer at room temperature with the removal of water. The composition consists of hydroxyl-terminated diorganopolysiloxane, silane containing at least 3 silicon-bonded hydrolyzable groups per molecule, curing catalyst, emulsifier, and water. In Example 1, they show polymerization of octamethylcyclotetrasiloxane in emulsion with dodecylbenzene sulfonic acid. After polymerization, they add silane or siloxane and tin laurate to give a mixture storable at least 30 days. Removal of water at room temperature gave a film which was elastomeric with a nontacky surface after sufficient drying time. The nonreinforced elastomer is suggested for use as a coating agent or fiber processing agent.

In U.S. Pat. No. 4,567,231, issued Jan. 28, 1986, Huebner and Saam teach a method of producing a latex of crosslinked polydiorganosiloxane having reinforcement derived from an acidic colloidal silica sol. Their method combines a mixture of hydroxyl endblocked polydiorganosiloxane, an alkyl functional silane, a surface active anionic catalyst, and acidic colloidal silica sol by homogenizing these ingredients immediately after mixing. By maintaining the emulsion at a temperature of from 15° to 30° C. for at least 5 hours at a pH of less than 5, a crosslinked polymer is formed. When water is removed from the latex at room temperature a reinforced elastomer results. It has been found that following the procedure of this invention results in a coating inside the homogenizer, which cures up in time and tends to plug up the homogenizer. Removing this coating from the homogenizer is difficult.

SUMMARY OF THE INVENTION

This invention relates to a method of preparing an aqueous latex of crosslinked polydiorganosiloxane. The method admixes a hydroxyl-endblocked polydiorganosiloxane of low viscosity with an alkoxy silicon compound, anionic emulsifying agent and water, then homogenizes the mixture to give an emulsion. The emulsion is then admixed with surface active anionic catalyst; then the catalyzed emulsion is maintained at least 5 hours at a pH of less than 5 to allow the polydiorganosiloxane to polymerize. After the desired molecular degree of polymerization is obtained, the pH is raised to greater than 7 to give a stable emulsion of crosslinked polydiorganosiloxane which yields an elastomer upon removal of the water at room temperature.

When the above mixture includes colloidal silica, present as an acidic silica sol during the polymerization, the latex dries to yield a reinforced elastomer. The latex can be used immediately after manufacture. There is no aging period required. The latex yields a cured elastomer upon removal of the water, no further cure is required. The latex has a long shelf life because no metallic catalyst is present in the composition.

DESCRIPTION OF THE INVENTION

A method of preparing an aqueous latex of crosslinked polydiorganosiloxane consisting essentially of (A) homogenizing immediately after admixing, a mixture consisting essentially of (1) 100 parts by weight of polydiorganosiloxane of the formula $HO(R_2SiO)_xH$ wherein each R is a radical selected from the group consisting of methyl, ethyl, propyl, phenyl, vinyl, alkyl, and 3,3,3-trifluoropropyl, and x is an average value in the range of from 3 to 100 inclusive, (2) from 0.5 to 15 parts by weight of alkoxy silicon compound selected from the group consisting of silane of the formula $R_a'$-$Si(OR^3)_{4-a}$ where R' is a monovalent hydrocarbon radical having up to 12 carbon atoms, $R^3$ is an alkyl radical having from 1 to 6 inclusive carbon atoms, and a is 0 or 1; a partial hydrolyzate of the silane when the partial hydrolyzate is soluble in the polydiorganosiloxane (1); and mixture of silane and partial hydrolyzate, (3) sufficient anionic emulsifying agent to give an emulsion particle of an average diameter of from 0.3 to 0.4 micrometers, and (4) water, to give a non-volatile content of from 50 to 80 percent by weight, then (B) admixing into the emulsion (A) from 15 to 100 millimoles of surface active anionic catalyst per kilogram of polydiorganosiloxane, then, (C) maintaining the catalyzed emulsion at a temperature of from 15° to 30° C. for at least 5 hours at a pH of less than 5 until the desired molecular weight of polydiorganosiloxane is obtained, then (D) admixing sufficient base to raise the pH of the emulsion to greater than 7, to give a latex having a non-volatile content of from 50 to 80 percent by weight, and which cures to an elastomer upon removal of the water at room temperature.

This method of producing an aqueous latex of crosslinked polydiorganosiloxane is particularly useful because the surface active anionic catalyst is added to the emulsion of polydiorganosiloxane and alkoxy silicon compound after the emulsion is formed. Previous procedures, which emulsified a mixture of polydiorganosiloxane, alkoxy silicon compound, colloidal silica and surface active anionic catalyst, were found to coat the inside of the homogenizer used to form the emulsion with an adherent coating. After operating for a relatively short period of time, the homogenizer had to be shut down, disassembled and cleaned. Cleaning was difficult because the coating was adherent and cured. The method herein claimed was developed to solve this problem.

The latices of this invention do not contain a metallic catalyst because the crosslinked polymer is readily formed in the emulsion without such a catalyst. Because no metallic catalyst is necessary, there is no problem with a catalyst continuing to cause crosslinking during storage of the latex and causing a change of physical properties of the elastomer after varying times of storage. Because there is no metallic catalyst, the heat stability of the resulting elastomer is expected to be superior to those products containing an active catalyst such as a tin compound. Because there is no metallic catalyst present, the elastomer produced by the method of this invention is expected to have a low toxicity.

The method of this invention results in a latex of crosslinked polydiorganosiloxane. Sufficient water is used in the emulsion to give a solids content of from 50 to 80 percent by weight. This latex can be used as a coating material. When dried, an elastomer is produced which is useful as a release coating, and as an electrical insulating coating, for example.

The method of producing a latex of crosslinked polydiorganosiloxane can be further modified by including colloidal silica reinforcement in the initial mixture of Step (A). The colloidal silica is in the form of an acidic silica sol. The water present in the acidic silica sol can be used as the water (4) or as a portion of it, if desired. Because of this, it is possible to make a latex having a solids content as high as 80 percent by weight. Even higher solids contents could be produced following this method, but it becomes difficult to obtain the desired dispersed phase of polydiorganosiloxane in a continuous water phase if less than this amount of water is present. Because the colloidal silica sol and the polydiorganosiloxane are homogenized together in making the emulsion in step (A), it requires little additional energy to obtain a homogeneous dispersion of the colloidal silica and the polydiorganosiloxane. When colloidal silica is included in the mixture of (A), the removal of water from the latex gives a reinforced, crosslinked, polydiorganosiloxane elastomer. Because the polymerization does not take place until after the homogenization, the equipment used for the homogenization does not become coated with reinforced, crosslinked elastomer. The latex can be used immediately after manufacture as no aging period is required. The latex has a long shelf life because no metallic catalyst is present in the composition. The elastomer produced by removing the water from the latex is fully cured, no further cure is necessary. As used herein, an elastomer comprises crosslinked polymer particles as a material that has a useful tensile strength, stretches under tension, and retracts rapidly to recover its original dimensions.

The hydroxyl endblocked polydiorganosiloxanes used in the method of this invention are well known in the art. The hydroxyl endblocked polydiorganosiloxane can be any of the polydiorganosiloxanes endblocked with hydroxyl radicals and can be represented by the formula

where each R is a radical selected from the group consisting of methyl, ethyl, propyl, phenyl, vinyl, allyl, and 3,3,3-trifluoropropyl, and mixtures thereof wherein at least 50 percent of the radicals are methyl radicals. The polydiorganosiloxane can be a single type polymer with the same kind of repeating diorganosiloxane units or it can be a combination of two or more kinds of repeating diorganosiloxane units, such as combinations of dimethylsiloxane units and methylphenylsiloxane units. The polydiorganosiloxane can also be a mixture of two or more kinds of polydiorganosiloxanes. The polydiorganosiloxanes are those in which x is an average value in the range of from 3 to 100 inclusive. The preferred polydiorganosiloxanes are those in which x is at least large enough that the viscosity of the polydiorganosiloxane is at least 0.05 Pa.s at 25° C. (x is about 25). A preferred polydiorganosiloxane is a polydimethylsiloxane having a viscosity of from about 0.05 Pa.s to 0.15 Pa.s at 25° C., the value of x for such a material being from about 25 to 80.

The alkoxy silicon compound used in the method of this invention is selected from the group consisting of silane of the formula

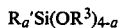

where R' is a monovalent hydrocarbon radical having up to 12 carbon atoms, R3 is an alkyl radical having from 1 to 6 inclusive carbon atoms, and a is 0 or 1; a partial hydrolyzate of the silane where the partial hydrolyzate is soluble in the polydiorganosiloxane (1); and mixtures of the silane and the partial hydrolyzate. These alkoxy silicon compounds are well-known in the art and many are commercially available. R' can be illustrated by radicals such as methyl, ethyl, propyl, isopropyl, butyl, hexyl, dodecyl, vinyl, allyl, phenyl, tolyl, and 3,3,3-trifluoropropyl. $R^3$ is an alkyl radical such as methyl, ethyl, propyl, and hexyl. Preferably both R' and $R^3$ are methyl. Preferred silanes include methyltrimethoxysilane and ethylorthosilicate with ethylorthosilicate most preferred. A preferred partial hydrolyzate of silane is ethylpolysilicate.

The amount of alkoxy silicon compound present can vary from 0.5 to 15 parts by weight based upon 100 parts by weight of the hydroxyl endblocked polydiorganosiloxane with a preferred amount of from 1 to 5 parts by weight. The amount of alkoxy silicon compound used has an effect upon the degree of crosslinking in the emulsion polymer. The preferred amount of crosslinker is dependent upon the hydroxyl endblocked polydiorganosiloxane used, the alkoxy silicon compound used, the time allowed for reaction, and the type and amount of surface active anionic catalyst. The preferred amount of crosslinker is determined by the users physical property requirements, in particular, how much elongation is desired in the elastomer produced. Higher amounts of alkoxy silicon compound cause more crosslinking so that the elongation of the elastomer falls to lower values.

The anionic emulsifying agent is an alkali metal surface active sulfonate or sulfate. The emulsifying agent can be any of those known to be useful for producing emulsions of polydiorganosiloxanes and water, such as alkali metal sulforicinates; sulfonated glyceryl esters of fatty acids; salts of sulfonated monovalent alcohol esters; amides of amino sulfonic acid, such as the sodium salt of oleyl methyl tauride; sulfonated aromatic hydrocarbon alkali salts, such as sodium alpha-naphthalene monosulfonate; condensation products of naphthalene monosulfonate; condensation products of naphthalene sulfonic acids with formaldehyde; and sulfates, such as sodium lauryl sulfate, triethanol amine lauryl sulfate, and sodium lauryl ether sulfate. Preferred is sodium lauryl sulfate.

The method of this invention uses a surface active anionic catalyst to catalyze the polymerization of the hydroxyl endblocked polydiorganosiloxane. The catalyst is a surface active sulfonic acid catalyst or a surface active hydrogen sulfate catalyst. The preferred surface active anionic catalyst is selected from the group consisting of a compound of the formula $R^2C_6H_4SO_3H$ wherein $R^2$ is a monovalent hydrocarbon radical of at least 6 carbon atoms; a compound of the formula $R^2OSO_2OH$ wherein $R^2$ is as defined above; a compound of the formula

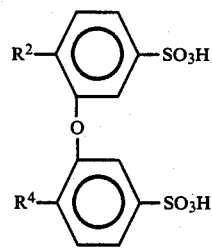

wherein $R^2$ is as defined above and $R^4$ is H or $R^2$, and mixtures thereof. $R^2$ contains at least 6 carbon atoms, and preferably no more than about 18 carbon atoms. $R^2$ includes hexyl, octyl, decyl, dodecyl, cetyl, myricyl, nonenyl, phytyl, and pentadecadienyl radicals. Most preferably $R^2$ has at least 10 carbon atoms. Preferred is the dodecyl radical.

The surface active anionic catalyst as used in this invention performs as a catalyst. It catalyzes the polymerization of the hydroxyl endblocked polydiorganosiloxane.

The sulfonic acids are available commercial products. The preferred sulfonic acids are dodecylbenzene sulfonic acid and dodecyldiphenyloxidedisulfonic acid. Hydrogen lauryl sulfate may be obtained by dissolving sodium lauryl sulfate in water, then adding hydrogen chloride to form the hydrogen lauryl sulfate and sodium chloride. Another method treats the sodium lauryl sulfate solution with a cation exchange resin which exchanges sodium ion for hydrogen ion. The solution of hydrogen lauryl sulfate is then used as the catalyst in the method of this invention. The hydrogen lauryl sulfate can also be produced in situ by homogenizing the polydiorganosiloxane, alkoxy silicon compound, with sodium lauryl sulfate, then adding hydrogen chloride to the emulsion formed by the homogenization to convert the sodium lauryl sulfate to hydrogen lauryl sulfate catalyst. This in situ process is considered to fall within the scope of the claims.

The emulsion of crosslinked polydiorganosiloxane of this invention can be reinforced by from 5 to 50 parts by weight of colloidal silica, per 100 parts by weight of hydroxyl endblocked polydiorganosiloxane, in the form of an acidic sol in water. The acidic silica sols are commercially available dispersions of colloidal silica in water. They have a pH of about 3. A typical sol contains about 34 percent by weight of colloidal silica having an average particle size of about 20 nanometers, with a pH of about 3.2.

The method of this invention is particularly adopted to make use of colloidal silica in the form of an acidic sol in water. By using the water in the sol as the water to form the emulsion of polydiorganosiloxane and colloidal silica, the latex produced can have a higher total solids content than if the polydiorganosiloxane were hydrolyzed and polymerized, then reinforced by adding a colloidal silica sol.

The method of this invention first homogenizes a mixture of the hydroxyl endblocked polydiorganosiloxane (1), the alkoxy silicon compound (2), and the anionic emulsifying agent (3) with water (4). The homogenization can be done by any of the known means of producing homogenized material such as a colloid mill. The homogenized material is in the form of an oil-in-water emulsion; that is, an emulsion of particles of polydiorganosiloxane and alkoxy silicon compound in a continuous water phase. Based upon 100 parts by weight of polydiorganosiloxane, from 0.5 to 15 parts by weight of an alkoxy silicon compound are used. The higher the level of alkoxy silicon compound used, the more crosslinking of the resulting polymer. If too much alkoxy silicon compound is used, the resulting polymer will have too much crosslinking and will be more resinous in its properties than elastomeric. Sufficient anionic emulsifying agent is used to give a particle size having an average diameter of from 0.3 to 0.4 micrometers. An average diameter of about 0.34 micrometers is preferred. Lowering the amount of emulsifying agent results in larger particle sizes, while raising the amount of emulsifying agent gives smaller particles, but too much emulsifying agent adversely affects physical properties of the final product. The preferred amount of anionic emulsifying agent is about 43 millimoles of emulsifying agent per kilogram of polydiorganosiloxane.

After the ingredients (1), (2), (3), and (4) are homogenized to give emulsion (A), from 15 to 100 millimoles of the surface active anionic catalyst, per kilogram of polydiorganosiloxane, is added by mixing into emulsion (A). This catalytic surfactant migrates to the surface of the polydiorganosiloxane micelles, where it catalyzes the condensation of the hydroxyl endblocked polydiorganosiloxane and the alkoxy silicon compound to produce a crosslinked polydiorganosiloxane. The polymerization takes place at a temperature of from 15° to 30° C. with a rate sufficiently rapid to be practical. A minimum time of 5 hours is necessary in order to allow a significant increase in the molecular weight of the polydiorganosiloxane and the formation of a crosslinked structure. After the reaction has proceeded to the desired degree, the pH of the emulsion is raised to greater than 7 by admixing a basic material into the emulsion in sufficient amount to raise the pH to greater than 7. A preferred method of raising the pH uses a dilute solution of sodium hydroxide or ammonium hydroxide or diethylamine. If not neutralized, the polymer continues to condense to form higher molecular weight polymer with more crosslinking. The preferred amount of reaction is a function of the intended use of the crosslinked polymer. If the crosslinked polymer is to be used as an electrical insulation coating, for instance, the polydiorganosiloxane needs to be polymerized only to a molecular weight of about 10,000. If the crosslinked polymer is to be used as a paper release coating where transfer may be a problem, or as a reinforced elastomer as discussed further in this application, then the polydiorganosiloxane is polymerized to a higher molecular weight, from 50,000 to 1,000,000 for example.

The aqueous emulsion of crosslinked polydiorganosiloxane can be further mixed with additional ingredients; such as filler, such as colloidal silica or extending fillers such as ground quartz, diatomaceous earth, and ground mica; pigments such as carbon black or ground iron oxide; and heat stability additives such as ceric hydrate. Any additive should be tested to assure that the stability of the emulsion is not adversely effected.

As pointed out above, the method of this invention can be modified to give an emulsion of crosslinked polymer which also contains reinforcing colloidal silica. This is done by including (5) from 5 to 50 parts by weight of colloidal silica present as an acidic sol in water in the mixture of (1), (2), (3), and (4) in step (A). The acidic colloidal silica sol is described above. It is a commercially available material; for example, Nalcoag 1034A, obtainable from Nalco Chemical Company. The sol is mixed with the other ingredients; the ingredients are homogenized together in step (A). The colloidal silica then is present during the polymerization step (C) which is carried out at a pH of less than 5. The ingredients are allowed to react until the desired degree of polymerization and crosslinking has taken place. The amount of reaction can be monitored by taking samples from the reaction mixture, raising the pH to greater than 7, drying the latex, and testing the elastomer produced. The amount of colloidal silica added is determined by the amount of reinforcement desired. As more silica is added, the higher the tensile strength and the higher the tensile modulus of the final elastomer. If too high an amount of colloidal silica is used, the product will no longer have elastomeric properties. The properties of this reinforced, crosslinked polydiorganosiloxane latex can also be varied by the addition of other ingredients such as thickeners, pigments, additional reinforcing, or extending filler, and heat stability ingredients such as those known for use with silicone elastomers. Additions should be tested for compatibility with the latex and their effect upon the elastomer produced. The latex produced by the method of this invention, because it can be produced at a high solids content, is particularly suited for producing latex useful as a caulking material. The latex may be combined with carbon black, graphite, or graphite fibers to yield cured films which are electrically conductive.

The following examples are presented for purposes of illustrating the invention and should not be construed as limiting the scope of the invention which is properly delineated in the claims. All parts are parts by weight.

EXAMPLE 1

A series of latices were prepared which cured to elastomers upon removal of the water.

A mixture was prepared by placing in a container 1837 g of hydroxyl endblocked polydimethylsiloxane having a viscosity of about 0.08 Pa.s at 25° C. and a degree of polymerization of about 35, 1090 g of acidic colloidal silica sol having about 34 percent by weight of colloidal silica having a particle size of about 20 nanometers and a pH of about 3.2 (20 parts silica/100 parts polymer), 83 g of ethylorthosilicate, 75.7 g of a 30 percent by weight solution of sodium lauryl sulfate (42.7 millimol per kg of polymer), and 104 g of distilled water. This mixture was cooled to 11° C. and homogenized by running it through a homogenizer twice, cooling the mixture to about 12° C. after the first pass through the mill. The emulsion was cooled to below 25° C. after the second pass and was mixed with 1.14 g of dodecylbenzene sulfonic acid for each 400 g of emulsion. This is equivalent to 15 millimols of dodecylbenzene sulfonic acid per kilogram of polydimethylsiloxane in the emulsion. After mixing, the pH was 2.9. The emulsion had a calculated solids content of about 72 percent by weight.

The emulsion was allowed to polymerize at room temperature. Periodically samples were removed from the polymerizing emulsion and made basic by adding 1 g of a 6% solution of sodium hydroxide to 50 g of the emulsion The viscosity was measured with a Brookfield viscometer using a number 3 spindle at 5 rpm. The polymer formed was evaluated by placing 3 g of the sample in an aluminum drying cup and removing the water by heating for 1 hour at 80° C. The results of these evaluations of the polymerization are shown in Table I. After 48 hours polymerization time, 1795 g of emulsion were mixed with 70 ml of 40% solution of sodium hydroxide solution to stop the polymerization and raise the pH to about 10.

TABLE I

| Polymerization Time, hrs. | Viscosity Pa·s | Polymer Appearance |
|---|---|---|
| Initial | 4.6 | crumbly, gooey |
| 2 | 4.6 | wet, gooey |
| 6 | 4.6 | slightly less gooey |
| 22 | 5.8 | elastomeric* |
| 29 | 6.2 | |
| 48 | 60.3 | |

*had tensile strength of approximately 0.5 MPa

After adding NaOH solution at the 48 hrs point, the viscosity of the emulsion dropped to 3.2 Pa.s. The measured solids content was about 67.5 percent by weight.

EXAMPLE 2

The latex of this invention was further compounded following a procedure disclosed in U.S. Pat. No. 4,559,369, issued Dec. 17, 1985, to show a use for the latex.

A composition was prepared by mixing 45.95 g of the above latex of Example 1, 3.43 g of a 35 percent by weight solution of disodium N-octyldecylsulfosuccinamate surfactant, and 0.34 g of of lauryl alcohol. The composition was placed in an aerosol can, the valve applied, and 4 ml of isobutane added as a blowing agent and propellant.

After mixing, the contents of the can were discharged onto a surface as a froth. The froth dried at room temperature to yield an elastomeric, open-cell foam having a density of 184 kg/m$^3$.

EXAMPLE 3

The remainder of the emulsion of Example 1 that was not mixed with sodium hydroxide was mixed with a 50 percent by weight solution of diethylamine to stop the polymerization. The viscosity was then measured and found to be 5.1 Pa.s

EXAMPLE 4

The latex of this invention was further compounded following a procedure disclosed in U.S. Pat. No. 4,559,369, issued Dec. 17, 1985, to show a use for the latex.

The emulsion of Example 3 was evaluated in a foam by mixing 45.55 g of emulsion, 2 g of the surfactant of Example 2, and 0.3 g of lauryl alcohol together and placing in an aerosol can. The valve was applied and 3 ml of isobutane added and the valve was sealed. After mixing, the contents were discharged onto a surface and allowed to form a froth which was then allowed to dry at room conditions. The resultant open-cell foam had a density of about 104 kg/m$^3$.

That which is claimed is:

1. A method of producing an aqueous latex of crosslinked polydiorganosiloxane consisting essentially of
   (A) homogenizing immediately after admixing, a mixture consisting essentially of
      (1) 100 parts by weight of polydiorganosiloxane of the formula $$HO(R_2SiO)_xH$$

wherein each R is a radical selected from the group consisting of methyl, ethyl, propyl, phenyl, vinyl, allyl, and 3,3,3-trifluoropropyl, and x is an average value in the range of from 3 to 100 inclusive,
      (2) from 0.5 to 15 parts by weight of alkoxy silicon compound selected from the group consisting of silane of the formula $$R_a'Si(OR^3)_{4-a}$$

wherein R' is a monovalent hydrocarbon radical having up to 12 carbon atoms, R$^3$ is an alkyl radical having from 1 to 6 inclusive carbon atoms, and a is 0 or 1; a partial hydrolyzate of the silane where the partial hydrolyzate is soluble in the polydiorganosiloxane (1); and mixture of silane and partial hydrolyzate,
      (3) sufficient anionic emulsifying agent to give an emulsion particle of an average diameter of from 0.3 to 0.4 micrometers, wherein said emulsifying agent is an alkali metal surface active sulfonate or sulfate, and
      (4) water, to give a non-volatile content of from 50 to 80 percent by weight, then
   (B) admixing into the emulsion (A) from 15 to 100 millimoles of surface active anionic catalyst per kilogram of polydiorganosiloxane, wherein said catalyst is a surface active sulfonic acid catalyst or a surface active hydrogen sulfate catalyst, then
   (C) maintaining the catalyzed emulsion at a temperature of from 15° to 30° C. for at least 5 hours at a pH of less than 5 until the desired molecular weight of polydiorganosiloxane is obtained, then
   (D) admixing sufficient base to raise the pH of the emulsion to greater than 7, to give a latex having a non-volatile content of from 50 to 80 percent by weight, and which cures to an elastomer upon removal of the water at room temperature.

2. The method of claim 1 in which the mixture of (A) includes (5) from 5 to 50 parts by weight of colloidal silica present as an acidic sol in water.

3. The method of claim 1 in which the anionic emulsifying agent (3) is an alkali metal salt of an alkyl sulfate.

4. The method of claim 2 in which the anionic emulsifying agent (3) is an alkali metal salt of an alkyl sulfate.

5. The method of claim 1 in which the surface active anionic catalyst of (B) is selected from the group consisting of a compound of the formula $$R^2C_6H_4SO_3H$$

wherein R$^2$ is a monovalent hydrocarbon radical of at least 6 carbon atoms, a compound of the formula $$R^2OSO_2OH$$

wherein $R^2$ is as defined above, a compound of the formula

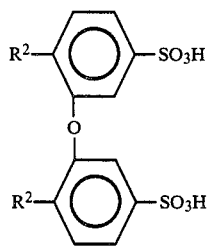

wherein $R^2$ is as defined above and $R^4$ is hydrogen or $R^2$, and mixtures thereof.

6. The method of claim 4 in which the alkali metal salt of an alkyl sulfate is sodium lauryl sulfate, and the surface active anionic catalyst of (B) is a compound of the formula $R^2C_6H_4SO_3H,$ wherein $R^2$ is a monovalent hydrocarbon radical of at least 6 carbon atoms.

7. The method of claim 6 in which the surface active anionic catalyst is dodecyl benzene sulfonic acid.

8. The method of claim 1 in which the alkoxy silicon compound is an alkylorthosilicate, partial hydrolyzate of alkylorthosilicate, or mixture of alkylorthosilicate and partial hydrolyzate of alkylorthosilicate.

9. The method of claim 8 in which the alkyl radical of the silicate is ethyl.

10. The method of claim 7 in which the alkoxy silicon compound is ethylorthosilicate, partial hydrolyzate of ethylorthosilicate, or mixture of ethylorthosilicate and its hydrolyzate.

11. The latex produced by the method of claim 1.

12. The latex produced by the method of claim 10.

13. The elastomer produced by removing the water from the latex of claim 11.

14. The elastomer produced by removing the water from the latex of claim 12.

15. The method of claim 1 wherein the anionic emulsifying agent is sodium lauryl sulfate and the surface active anionic catalyst is formed in situ by addition of hydrochloric acid.

* * * * *